Figure 1:
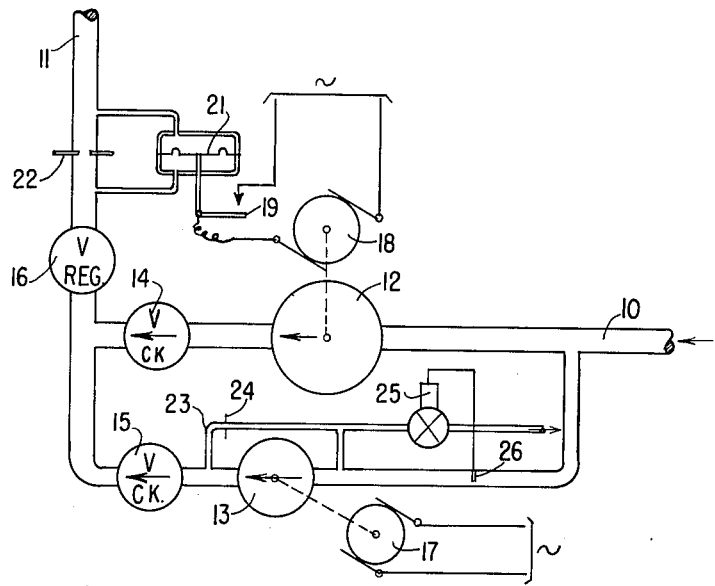

Aug. 3, 1965  R. F. SCHAUB  3,198,121
TANKLESS WATER PRESSURE SYSTEM
Filed Sept. 26, 1962  2 Sheets-Sheet 1

INVENTOR.
Robert F. Schaub
BY
Attys.

Aug. 3, 1965   R. F. SCHAUB   3,198,121
TANKLESS WATER PRESSURE SYSTEM
Filed Sept. 26, 1962   2 Sheets-Sheet 2
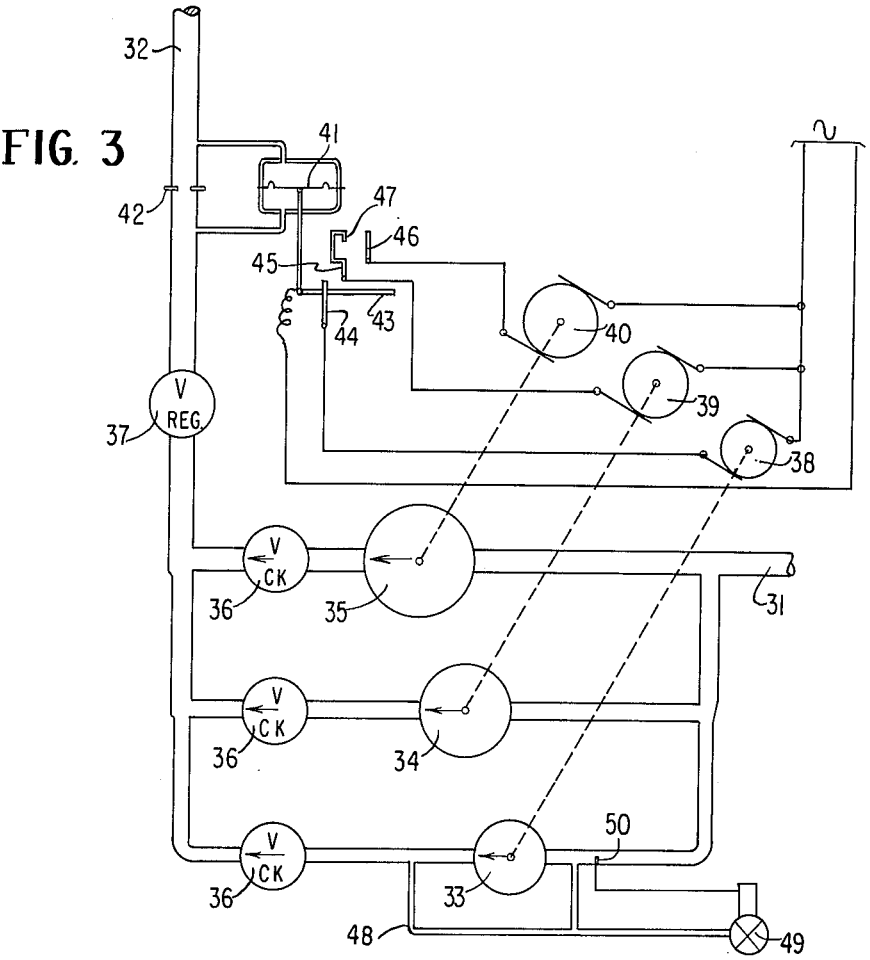
INVENTOR.
Robert F. Schaub
BY
*Attys.*

United States Patent Office 3,198,121
Patented Aug. 3, 1965

3,198,121
TANKLESS WATER PRESSURE SYSTEM
Robert F. Schaub, La Grange, Ill., assignor to Syncroflo,
Inc., a corporation of Illinois
Filed Sept. 26, 1962, Ser. No. 227,115
2 Claims. (Cl. 103—11)

This invention relates to a tankless water pressure system and more particularly to a system for boosting water supply pressure for multi-story buildings and the like.

City water pressure, as supplied through the city mains, is normally inadequate to supply multi-story buildings, such as office buildings, apartments houses, hospitals and even some industrial buildings. It therefore becomes necessary for such buildings to utilize a pressure booster system to increase the pressure on the water supplied through the city mains or from other sources.

One system heretofore used is a hydro-pneumatic tank system. Such systems have the disadvantage of requiring large expensive tanks occupying a large amount of space, normally require a separate air compressor, involve substantial fluctuations in the pressure of the water supplied, and increase the air content in the water thereby increasing its corrosive action on the plumbing.

Tankless systems have also been proposed utilizing one or more continuously operating pumps driven through variable speed driving mechanisms which are controlled in response to the demand to vary the pump speed. While such systems maintain the pressure within closer limits than a tank system and eliminate the need for the tank and air compressor, they are expensive to install and are difficult and expensive to maintain, due to the complexities of the variable speed driving mechanisms and the controls therefor. Systems of this type, however, occupy a substantial amount of space.

It is accordingly an object of the present invention to provide a tankless water pressure system which is simple and inexpensive to install and maintain, which occupies a minimum amount of space and which maintains the pressure within very close limits.

Another object is to provide a system in which a plurality of pumps of different sizes are successively brought into operation in response to the demand for water.

According to a feature of the invention, the pumps are so controlled that the larger size pump is brought into operation a short interval of time before the next smaller size pump is cut out to insure that there will be no interruption in pressure. For maximum demand the largest pump may be operated alone or in combination with one or more smaller pumps.

According to a further feature of the invention, the smallest pump is provided with a restricted bypass to function when there is no demand and a waste valve is connected to the bypass and controlled in response to the water temperature to prevent an excessive temperature buildup due to recirculation.

Figure 2:
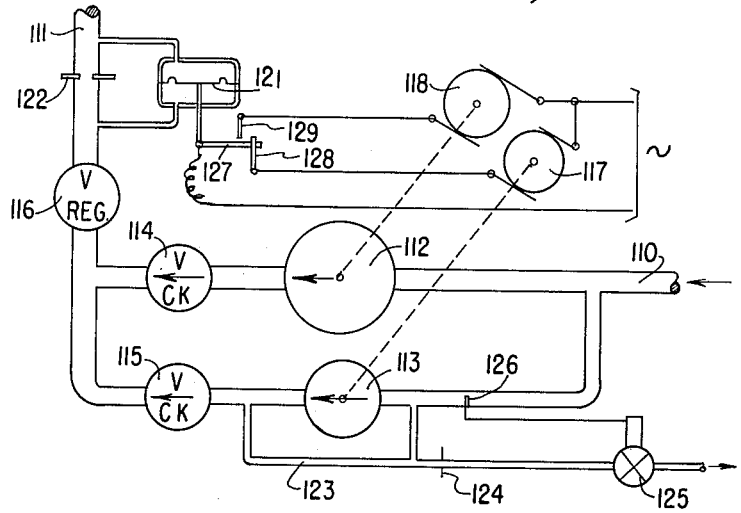

The above and other objects and features of the invention will be more readily apparent from the following description when read in connection with the accompanying drawings, in which:

FIGS. 1, 2 and 3 are diagrammatic views of alternative tankless water pressure systems embodying the invention.

As shown in FIG. 1, water is supplied through a supply main 10 from a city water system, a pump, or other source of water. The pressure of the water supplied through the main 10 is increased to the desired value for supply of a high rise building or other demand and is pumped into a water line conduit 11 which supplies water to the building. It may be noted that the head of water supplied through the conduit 11 must be slightly greater in feet than the height of the building so that water under pressure will be available on the top stories of the building which may be as much as several hundred feet high.

Water is taken from the main 10 and is pumped into the water supply conduit 11 by a large high capacity pump 12 and a smaller lower capacity pump 13 which are connected in parallel between the supply main and the water line conduit, as shown. Preferably check valves 14 and 15 are provided between the respective pumps and the water line conduit and a regulating valve 16 is provided in the water line conduit to regulate the pressure of water supplied to the building.

In the arrangement shown in FIG. 1, the small pump 13 whose capacity may be, for example, on the order of 20 to 40 gallons per minute is continuously driven by a relatively small electric motor 17 directly connected to the pump and functioning continuously to operate the pump. The pump 12 is directly connected to a larger electric motor 18 which is connected to the supply line through a switch 19 to operate only when the switch is closed. The switch is controlled in response to the demand for water as measured by the flow through the conduit 11 by any suitable type of flow responsive device. As shown diagrammatically in FIG. 1, a diaphragm 21 is connected across a restriction 22 in the conduit 11 and is connected to the switch to close it when the flow through the conduit exceeds a predetermined value.

In operation, as so far described, whenever the demand is below the capacity of the small pump 13, say 20 to 40 gallons per minute, the switch 19 will be open and the pump 12 will be inoperative. When the demand exceeds the capacity of the small pump, the switch 19 will close to start the larger pump 12 into operation and at this time both pumps will supply water to the water line conduit 11 in parallel with each other. The capacity of the larger pump may be selected in accordance with the anticipated maximum demand, but for most buildings would be on the order of 100 to 300 gallons per minute.

According to a further feature of the invention and in the event there may be long intervals in which flow through the conduit 11 is zero, or substantially zero, a bypass is provided around the pump 13. As shown, a relatively small conduit 23 is connected between the pump outlet and the pump inlet and is provided with a restriction 24 to limit flow through the bypass. When the demand is zero or substantially zero, a small portion of the output of the pump 13 continues to flow through the bypass back to the pump inlet to unload the pump 13. Should the small bypass flow continue for a long interval without flow to the load, there would be a temperature buildup which might raise the temperature of the water to an undesired extent. To prevent excessive increase of temperature the bypass is provided with a waste or dump valve 25 controlling connection of the bypass to a sewer, or the like, and which is controlled in response to temperature in the water inlet conduit to the pump 13 as measured by a bulb 26, or the like. As long as the water in the pump inlet conduit remains below a predetermined value the valve 25 will be closed. However, should the temperature exceed the predetermined set value, the valve 25 will open and allow at least a part of the bypassed water to flow to waste. Since the water wasted would be the hottest water and since fresh incoming cold water would replace it in the system this relatively simple expedient will prevent excessive temperature buildup in the event of long periods of no demand.

FIG. 2 illustrates a system generally similar to FIG. 1, except for modification of the controls and parts therein corresponding to like parts in FIG. 1, are indicated by the same reference numerals plus 100. In the construction shown in FIG. 2 the flow responsive element 121 controls two switches which respectively control the motors 117 and 118 for driving the small and larger pumps. The switches are so arranged that below a predetermined rate of water flow, only the motor 117 is energized while above the set rate only the motor 118 is energized with a slight overlapping to insure that the larger pump 112 will be delivering water properly before the smaller pump is shut off. As shown in the drawing, the diaphragm controls a wiper 127 which wipes over contact strips 128 and 129. The wiper is connected to one side of the power circuit, the other side of which is connected to the motors and the contact strips 128 and 129 are connected to the motors, respectively. When the flow is low, the wiper will be in a lowered position to engage only the contact strip 128 thereby to energize only the motor 117 to operate the small pump. As the flow increases, the wiper will move up to the position in which it contacts both strips 128 and 129 for a brief overlapping interval. Upon further increase in flow, the wiper will move still further up to contact only the strip 129 thereby to energize only the large motor 118 and to operate only the large pump 112. This system differs from that of FIG. 1 in that the small pump does not operate continuously, but otherwise functions in substantially the same manner.

FIG. 3 shows another alternative system utilizing three pumps, it being understood that any desired number of pumps of different sizes could be employed and that the pumps represented in the drawings could be single pumps or could include several identical pumps in parallel with each other. As shown in FIG. 3, water is supplied to a main or similar supply conduit 31 and is pumped into a water line conduit 32 leading to the point of use. In this instance, three pumps are illustrated, the pump 33 being a small capacity pump on the order of 20 gallons per minute, the pump 34 being a larger pump on the order of 80 gallons per minute capacity and the pump 35 being the largest pump having a capacity on the order of 200 gallons per minute. The three pumps are connected in parallel between the main 31 and the conduit 32 with check valves 36 being provided between the pump outlets and the conduit 32 to regulate the pressure of water supplied to the point of use.

The pumps are driven respectively by electric motors 38, 39 and 40, which are directly connected to the respective pumps. For controlling the motors, a flow responsive device, such as diaphragm 41, is connected across a restriction 42 in the conduit 32 and operates switches which control the several motors.

As shown diagrammatically, the switches include a wiper 43 movable over contact strips 44, 45 and 46 which are connected respectively to the pumps 38, 39 and 40. The strip 44 overlaps slightly the lower end of the strip 45 and the strip 45 in turn overlaps slightly the lower end of the strip 46 so that each pump, as they operate successively, will commence operation before the preceding smaller pump is shut off. Additionally, the contact strip 45 includes a short section 47 registering with the upper end of the contact strip 46 so that the two pumps 34 and 35 will operate simultaneously under maximum demand conditions.

When the demand is small, say 20 gallons per minute or less, the wiper 43 will be in the lower position, as shown, in which it engages only the contact strip 44 to energize only the small motor 38 so that only the smallest pump 33 is operating. As the demand increases the wiper will move up until it contacts the contact strip 45 to energize the intermediate motor 39 and to operate the intermediate pump 34. After the small period of overlap to insure that the pump 34 will be delivering water properly before the pump 33 is shut off, only the pump 34 will operate. Upon a still further increase in demand, the wiper 43 will move up to contact the contact strip 46 and energize the large motor 40 to drive the large pump 35. When the demand exceeds the capacity of the intermediate pump, say 80 gallons per minute, and is less than the capacity of the largest pump, say 200 gallons per minute, only the largest pump 35 will be operating. Upon a still further increase in demand beyond the capacity of the largest pump, say 200 gallons per minute, the wiper will contact both the contact strips 46 and 47 to operate both pumps 34 and 35 simultaneously. With the pump capacities mentioned above, this will provide a maximum operating capacity of 280 gallons per minute. It is to be understood that capacities indicated are for the purpose of illustration of a rationing technique only.

The smallest pump 33 is provided with a bypass 48 similar to the bypass 23 of FIG. 1 and includes a waste valve 49 controlled in response to the temperature at the inlet of the small pump as, for example, by a bulb 50.

In physically arranging the several pumps and controls of the system, it will be noted that they can be stacked vertically so that they will occupy a very small amount of floor space in the building. The controls are relatively simple, both from the standpoint of installation and of operation and maintenance and function to insure that sufficient capacity is available at all times to meet the demand. Thus with the present system, a relatively simple and inexpensive installation can easily and accurately satisfy largely varying requirements of high rise buildings or similar demands for high pressure water.

While several embodiments of the invention have been shown and described herein, it will be understood that they are illustrative only and not to be taken as definition of the scope of the invention, reference being had for this purpose to the appended claims.

What is claimed is:

1. A tankless water pressure system comprising a plurality of pumps of different sizes connected in parallel between a source of water and a water line conduit, control means in said water line conduit and being responsive to the flow of water therein, said control means being adapted to cause only a smaller of said pumps to continuously operate below a predetermined flow rate in said water line conduit and also being adapted to operate a larger of said pumps when the flow in said water line conduit is above said predetermined rate, a restricted bypass around said smaller pump for allowing the circulation of water through said smaller pump when the flow rate in said water line conduit is at zero or substantially zero, a normally closed waste valve connected to said bypass, and a temperature responsive means for opening said waste valve for discharging water from said bypass when the temperature of the circulating water therein exceeds a predetermined set value.

2. The tankless water pressure system of claim 1 including a pressure regulating valve in said water line conduit for maintaining the pressure in said water line conduit at a desired, substantially constant level, and check valves positioned between each of said pumps and said water line conduit in order to prevent the backflow of water into said pumps.

References Cited by the Examiner

UNITED STATES PATENTS

| | | | |
|---|---|---|---|
| 1,905,284 | 4/33 | Heitger | 103—41 |
| 2,672,820 | 3/54 | Hillier | 103—41 |
| 2,741,986 | 4/56 | Smith | 103—11 |
| 2,812,110 | 11/57 | Romanowski | 103—11 |
| 2,888,875 | 6/59 | Buck | 103—11 |
| 2,983,226 | 5/61 | Livermore | 103—42 |
| 3,135,282 | 6/64 | Gray | 103—11 |

FOREIGN PATENTS 813,336   5/37   France.

LAURENCE V. EFNER, *Primary Examiner.*